(12) United States Patent
Vetter

(10) Patent No.: US 10,026,220 B2
(45) Date of Patent: Jul. 17, 2018

(54) LAYERED LIGHTFIELDS FOR OCCLUSION HANDLING

(71) Applicant: Siemens Healthcare GmbH, Erlangen (DE)

(72) Inventor: Christoph Vetter, East Windsor, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 87 days.

(21) Appl. No.: 15/158,046

(22) Filed: May 18, 2016

(65) Prior Publication Data

US 2017/0337730 A1 Nov. 23, 2017

(51) Int. Cl.

| G06T 15/08 | (2011.01) |
|---|---|
| G06T 15/80 | (2011.01) |
| G06T 1/20 | (2006.01) |
| G06T 15/20 | (2011.01) |
| G06T 11/40 | (2006.01) |
| G06T 15/40 | (2011.01) |
| G06T 19/00 | (2011.01) |
| G06T 7/70 | (2017.01) |

(52) U.S. Cl.
CPC ............. *G06T 15/80* (2013.01); *G06T 1/20* (2013.01); *G06T 7/70* (2017.01); *G06T 11/40* (2013.01); *G06T 15/08* (2013.01); *G06T 15/20* (2013.01); *G06T 15/40* (2013.01); *G06T 19/003* (2013.01); *G06T 2200/04* (2013.01); *G06T 2200/21* (2013.01); *G06T 2207/10052* (2013.01); *G06T 2207/10068* (2013.01); *G06T 2207/30004* (2013.01)

(58) Field of Classification Search
CPC ....... G06T 15/08; G06T 15/20; G06T 15/205; G06T 15/80; G06T 19/003; G06T 2200/04; G06T 2207/10052; G06T 2207/10068; G06T 2207/10072
See application file for complete search history.

(56) References Cited

U.S. PATENT DOCUMENTS

| 2009/0103793 | A1* | 4/2009 | Borland ............... G06T 15/08 382/131 |
| 2009/0295800 | A1 | 12/2009 | Vetter et al. |
| 2015/0262399 | A1* | 9/2015 | Popescu ............... G01C 21/32 345/630 |

OTHER PUBLICATIONS

Cohen et al. (NPL "Wang tiles for image and texture generation"). Citation: Cohen, Michael F., et al. Wang tiles for image and texture generation. vol. 22. No. 3. ACM, 2003.*
Gortler, Steven J., et al. "The lumigraph." Proceedings of the 23rd annual conference on Computer graphics and interactive techniques. ACM, 1996.

(Continued)

*Primary Examiner* — Diane Wills

(57) ABSTRACT

For occlusion handing in lightfield rendering, layered lightfields are created. Rather than use one lightfield for one camera position and orientation, multiple lightfields representing different depths or surfaces at different depths relative to that camera position and orientation are created. By using layered lightfields for the various camera positions and orientations, the camera may be located within the convex hull or scanned object. The depths of the layers are used to select the lightfields for a given camera position and location.

14 Claims, 3 Drawing Sheets

(56) References Cited

OTHER PUBLICATIONS

Levoy, Marc, and Pat Hanrahan. "Light field rendering." Proceedings of the 23rd annual conference on Computer graphics and interactive techniques. ACM, 1996.
Shade, Jonathan, et al. "Layered depth images." Proceedings of the 25th annual conference on Computer graphics and interactive techniques. ACM, 1998.
Extended European Search Report dated Jul. 26, 2017 in corresponding European Application No. 17171207.8.
Levoy M et al.: "Light Field Rendering", Computer Graphics Proceedings 1996; (SIGGRAPH). New Orleans, [Computer Graphics Proceedings (SIGGRAPH)], New York, NY : ACM, US, pp. 31-42, Aug. 4, 1996.
Rezk-Salama et al.: "Raycasting of Light Field Galleries from Volumetric Data"; May 12, 2008; Computer Graphics Forum; vol. 27; No. 3; pp. 839-846.

\* cited by examiner

LAYERED LIGHTFIELDS FOR OCCLUSION HANDLING

BACKGROUND

The present embodiments relate to lightfield imaging. In medical imaging, the interior of a patient is scanned. Three-dimensional (3D) visualization is a common practice to assess and record the internal conditions of patients. The scan data is used to render an image of the patient. Interiors of other objects, whether represented by scan data or created as a model, may be imaged in non-medical environments. Images simulating a "fly-through" or from different viewpoints within the volume may be generated. The user may interact with the rendering to alter the location of the viewpoint, direction of viewing from the viewpoint, and/or rendering parameters.

In terms of high-performance rendering from the volume of a large amount of data, interactive or real-time rendering may be difficult. Volume rendering for highly realistic or 'cinematic' quality based on stochastic Monte-Carlo sampling of the volume requires a number of rays that cannot be handled easily, even by modern high-end graphics processing units. During interactive manipulation of the volume, like rotating or zooming, the user is presented with a rendering in progress. This incomplete rendering allows interaction. Due to the low number of rays that have been traced to allow interaction, the image contains rendering artifacts resulting in noisy images. Providing interactivity by sacrificing image quality is not desired.

Lightfield rendering solves the problem of interactivity with the compromise of requiring a huge amount of (compressible) data. However, lightfields have the disadvantage that allowable camera positions have to be outside the convex hull of the object or objects that are imaged. This precludes standard lightfield rendering from moving the camera into concave regions of the object, inside the object, or through the object, such as done for colonoscopy fly-through. The convex hull of the object captured in the lightfields occludes the interior.

BRIEF SUMMARY

By way of introduction, the preferred embodiments described below include methods, systems, instructions, and computer readable media for occlusion handing in lightfield rendering. Layered lightfields are created. Rather than use one lightfield for one camera position and orientation, multiple lightfields representing different depths or surfaces at different depths relative to that camera position and orientation are created. By using layered lightfields for the various camera positions and orientations, the camera may be located within the convex hull or scanned object. The depths of the layers are used to select the lightfields for a given camera position and location.

In a first aspect, a method is provided for occlusion handling in lightfield rendering. For a first camera perspective, lightfields for first and second depths are generated such that the lightfield for the second depth is free of occlusion from a first object included in the first depth where the first depth separates the second depth from a camera having the first camera perspective. A position of the camera relative to the first and second depths is determined. A renderer renders an image from the lightfields based on the position of the camera relative to the first and second depths. The image is displayed on a display.

In a second aspect, a non-transitory computer readable storage medium has stored therein data representing instructions executable by a programmed processor for occlusion handling in lightfields. The storage medium includes instructions for: identifying surfaces represented in a volume at different depths along each of a plurality of ray lines from each of a plurality of camera positions; determining radiance at each of the surfaces along each of the ray lines for each of the camera positions; and recording into memory the radiances from the different surfaces as layers of tiles for each of the camera positions, the layers corresponding to different depths of the surfaces for each of the camera positions.

In a third aspect, a system is provided for occlusion handling in lightfield rendering. A scanner is configured to scan a volume including different objects. The scan provides scan data representing the different objects in the volume. A memory is configured to store layered lightfields generated from the scan data. The layered lightfields are for different depths for a first view direction. A graphics processing unit is configured to render an image of the volume from the layered lightfields where different layers of the layered lightfields are selected for different locations in the image based on a location of a virtual camera along the first view direction. A display is configured to display the image.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Layered lightfields allow for occlusion handling. Layered depth images are extended to lightfields. These layered lightfields may be efficiently created using traced rays extending through different layers and may be efficiently stored using layer-independent compression. With the addition of layers in a tile based representation, views from within concave regions of the object of interest can be generated, allowing colonoscopy rendering that is not possible without.

Figure 1:
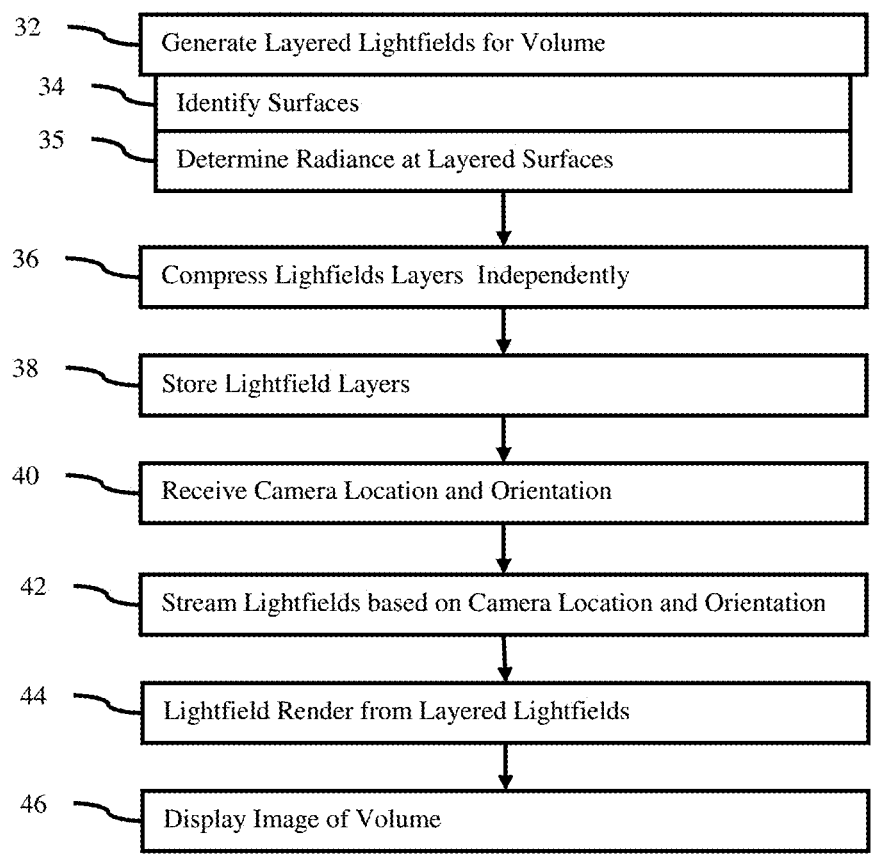
FIG. 1 is a flow chart diagram of one embodiment of a method for occlusion handling in lightfield rendering.

FIG. 1 shows one embodiment of a method for occlusion handling in lightfield rendering. Lightfields are generated in layers. For each camera position and orientation, more than one lightfield may be created so that objects beyond occlusions may be represented. For rendering, the lightfields at different depths are available for rendering, allowing rendering of the camera passing through objects and/or rendering from within the convex hull of an object.

Figure 5:
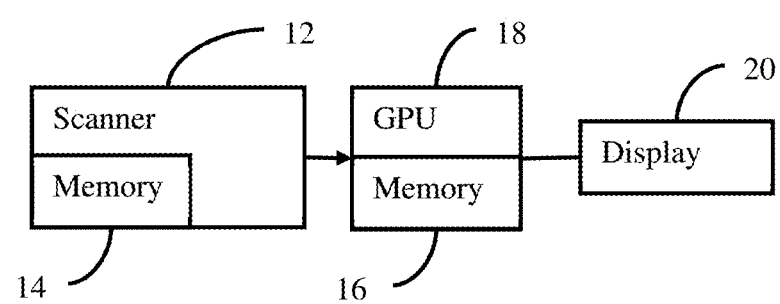
FIG. 5 is a block diagram of one embodiment of a system for occlusion handling in lightfield rendering.

The method is implemented by the system of FIG. 5 or another system. For example, the scanner, graphics processing unit, computer, server, or other processor performs acts 32-35 and 42. The lightfield layers are stored in a memory or database in act 38. The same or different scanner, graphics processing unit, computer, server, or other processor performs acts 40, 44, and 46. Any one or more of the acts may be performed by different devices.

The acts are performed in the order shown or other orders. For example, acts 36 and 38 are performed in the order shown or a reverse order. As another example, act 40 is performed before acts 32, 36, and/or 38.

Additional, different, or fewer acts may be provided. For example, act 46 is not performed and the image is instead transmitted to another device or stored. As another example, acts 32-38 are performed without performing acts 40-46, or vise versa. In yet another example, other acts for creating and/or using lightfields are performed. Acts for interactive rendering may be provided.

In act 32, a renderer, scanner, or computer generates lightfields for different depths. Layered lightfields are created from scan data, a three-dimensional model, or other representation of surfaces or objects. In medical imaging, a set of voxels representing a patient are used to generate the lightfield. Scan data from computed tomography, magnetic resonance, ultrasound, x-ray, positron emission tomography, single photon emission computed tomography, or other scan mode is acquired by scanning the patient and/or loading from memory. The scan data may be segmented, such as applying thresholds or other processing, to identify specific objects represented in the scan data.

Any generation of lightfields may be used. Lightfield rendering creates virtual views from previously rendered or photographically captured image data. The previously rendered or captured image data are the lightfields. This approach allows recreating views of real scenes in every detail, including very subtle interactions between light and matter. By pre-generating the views, complex or processing expensive rendering algorithms may be used to produce the lightfields. The lightfields are then used for real-time rendering and/or interactive rendering.

Lightfields are a simplified version of the plenoptic function. The plenoptic function captures the radiance for every position and orientation in a region of space. With three dimensions that describe the position and two dimensions that describe the orientation, this results in a five-dimensional function. Given the plenoptic function, every possible view within that scene can be reconstructed as lightfields prior to interactive rendering. The plenoptic function is sampled for every viewing ray possibly generated by the camera.

The five-dimensional plenoptic function is large in practice. Additionally, sampling of the plenoptic function is not possible within occluded spaces. Therefore, the following simplifying assumptions are made. The plenoptic function is sampled outside the bounding hull of the object rendered, and the empty space (that is air) around the object does not attenuate the light. With these assumptions, the radiance along a ray stays constant, and the dimensions may be reduced by one, resulting in a more manageable four-dimensional function, the lightfield.

A simple way to parameterize the lightfield is with a light slab. Two (finite) planes are introduced around the object of interest. With the position on the first plane described by the vector (s,t), and the position on the second plane described by the vector (u,v), images are generated by shooting a ray from every possible (discretized) position (s,t) to every (u,t). As long as the camera frustum does not partially lie outside these planes, every view may be reconstructed as a collection of lightfields. In order to capture the object from different sides, six of these light slabs are used.

Another approach to the parameterization is to use two enclosing spheres. The camera origin then moves on the outer sphere and captures images of the inner sphere. The inner sphere is still outside or equal to the bounding sphere of the object of interest. A lightfield (e.g., rendered image) is created for each of the camera origins and/or view directions. In the following, spherical parameterization of the lightfield is used since this reduces the number of artifacts compared to slabs. The same approach is still possible with other parameterizations, such as slabs.

Figure 2:
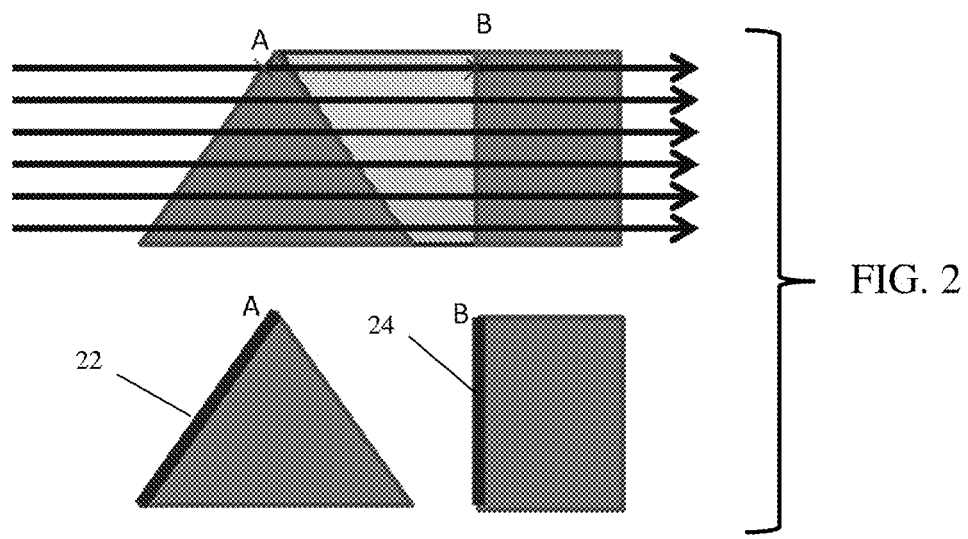
FIG. 2 illustrates an example of generating layered lightfields to handle occlusion.

So far, the camera stays outside of the convex hull of the volume being imaged in order to be able to generate images as the lightfields. FIG. 2 shows two objects A and B with ray lines representing a given view for a given camera position. For a lightfield with one layer, the radiance along the front surface 22 of object A is determined. The front surface 22 occludes the rest of the volume for this camera position. No lightfields capturing information other than the surface 22 of object A is provided. Upon rendering, the camera cannot enter the objects A, B, or the region between the objects since there is no image data (i.e., lightfields) available.

Layered lightfields provide a solution to this occlusion problem. The assumption that the radiance along a ray stays constant does not hold for layered lightfields. Instead, the radiance is assumed constant along ray segments through free space but with the radiance being piece-wise constant along the ray. Air is still assumed to not have any attenuating effect on the light, but the interaction with occluded surfaces is no longer avoided.

In one embodiment of act 32, acts 34 and 35 are performed. The layered lightfields for a volume are generated by identifying surfaces in act 34 and determining the radiance at the surfaces along the rays in act 35. In other embodiments, segmentation and separate lightfield generation (e.g., surface or volume rendering) are performed for different objects at different depths. Any clipping to remove occlusion for generating lightfields that would otherwise be occluded may be used. For each given camera perspective, lightfields are generated at different depths such that the lightfield for the second depth (e.g., object B) is free of occlusion from a first object (e.g., object A) included in the first depth where the first depth separates the second depth from a camera having the first camera perspective (i.e., occludes).

In act 34, surfaces represented in a volume at different depths are identified along each of a plurality of ray lines from each of a plurality of camera positions. The surfaces are identified from a three-dimensional model and/or scan data representing a volume. Segmentation or other processing may distinguish between types of tissue. Alternatively, thresholding, gradient, or other process is applied along the ray lines to identify surfaces, such as surfaces associated with different types of tissue, cysts, lesions, and/or folds in tissue of a volume representing a patient.

In the example of FIG. 2, the rays intersect the two objects A, B. For the rays shown, the radiance for the front (relative to the camera perspective shown) surfaces 22, 24 of the objects are recorded, as represented by the thick lines on the front surfaces 22, 24 of objects A and B in the bottom of FIG. 2. The radiances are the lightfields in two layers.

Layers may be generated on a per-ray basis. When rendering the lightfield, not only the correct ray, but also the correct segment or depth (i.e., layer) is determined. The depth information for each surface 22, 24 is identified as well as the lightfields at that depth.

The depth or layer may be for a range of depths. For a given camera perspective, groups of two or more ranges are defined and the lightfields at each range generated. Alternatively, each ray has a number and/or depth resolution based on the objects encountered along the ray. The space complexity of the lightfield is increased by a factor that depends on the depth complexity of the scene.

The layered approach may be more easily implemented for rendering lightfields from a synthetic scene. With real life scenes, such as from scan data representing a patient, capturing the information behind occluders becomes a challenge. Segmentation may be used to create a 3D model with specific objects and surfaces. Alternatively, the scan data along the rays is processed to identify the different surfaces. Whenever a viewing ray hits a surface, the illumination at this point is determined in act 35 (e.g., points X on objects A and B in FIG. 2). Instead of returning or ending, the viewing ray is traced further until the ray hits another object or type of tissue (e.g., at point X on object B in FIG. 2).

In the approach shown in FIG. 2, the surfaces 22, 24 are identified as the surfaces 22, 24 of each object A, B first intersected by the ray. In other embodiments, both the entry and exit surfaces are identified. In yet other embodiments, interior surfaces are identified. As an alternative, the objects may be identified and projection rendering for a range of depths encompassing the object or part of the object is performed to generate the lightfield (e.g., alpha blending, maximum intensity, or average rendering).

In act 35, the radiance at each of the surfaces is determined. The radiance for each of the ray lines and each layer along the ray lines for a given camera view is calculated. The radiance is determined for each surface, each object, and/or each depth. Since multiple layers are used, the radiances for surfaces that are otherwise occluded are found. Lightfields are generated for the different surfaces or layers.

Any lightfield radiance determination may be used. Any transfer function, illumination model, type of rendering, or other setting may be used to create the lightfield. In one embodiment, a surface rendering of all objects viewable from the camera without removing other objects is formed as the lightfield. The depths of the surfaces in this lightfield per pixel or other sub-region are recorded. Surfaces or objects in the first lightfield are removed to avoid occlusion. After this clipping, surface rendering for the next layer of visibility is performed to create the next layer of lightfield. The process continues until there are no more remaining surfaces. In other embodiments, a lightfield is rendered for each range of depths. The data from a previously rendered range of depths is removed for rendering a next range of depths. Alternatively, data at different ranges are used to rendering lightfields for those different ranges or each surface encountered along each ray.

In one embodiment, the lightfields for each camera view are divided into tiles. Each tile represents one or more pixels of the lightfield. For example, each tile represents a 10×10 pixel area. Instead of considering each ray with its layers on its own, the different layers are arranged in tiles. The lightfields are determined as tiles. Each tile for a layer is rendered separately or formed from a rendered image of the whole lightfield. The radiance and orientation (plenoptic function) is provided for each location in the lightfield.

Figure 3:
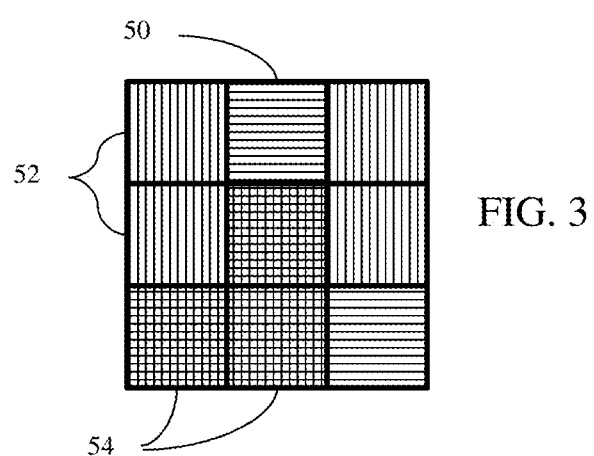
FIG. 3 illustrates an example of tiled layering of lightfields.

For each lightfield layer, tiles are provided. The same number of tiles may be provided for each layer. Alternatively, some layers include more or fewer tiles than other layers. Where no surface and/or object occur at a given layer for the sub-region of the tile, the lightfield for that tile are not provided for that layer. Different tile positions have different numbers of layers of tiles. FIG. 3 shows an example. Some tiles 50 (horizontal lines) have one layer. Other tiles 52 (vertical lines) have two layers. Yet other tiles 54 (crossed lines) have three layers.

One layer includes tiles for all sub-regions. Alternatively, there may be a tile location that has no lightfields, such as where the ray lines do not pass through a surface or object. A given tile location has any number of layers and in any of different depths. One set of tiles for a given depth include radiance and orientation information visible for that depth. Another set of tiles for a different depth include radiance and orientation information visible for that depth without occlusion from the surfaces or object in the shallower depth. Each layer of tiles includes the lightfield for the spatial sub-regions at that depth. One set of tiles for one depth may include tiles for spatial locations not included in another set of tiles for another depth and may include tiles for spatial locations included in the other set of tiles for the other depth.

Pixels within a ray may be behind occluders and potentially different objects. For scenes in which only certain rays have a higher depth complexity (e.g., number of surfaces intersected by a given ray), tiling allows storage of the different layers in a virtual texture on the GPU. For a medical imaging embodiment, medical scan data is used to generate the lightfields at different layers, allowing texture for interior parts of the patient that may otherwise be excluded.

Referring again to FIG. 1, a scanner, computer, graphics processing unit, compression chip, application specific integrated circuit, field programmable gate array, or other device compresses the lightfields in act 36. Since lightfields are generated for many different camera views and may include multiple layers, a large amount of data that may or may not be used for interactive rendering is generated. To reduce the size of data to be stored and/or transmitted, the data is compressed.

JPEG or other compression may be used. Any now known or later developed compression may be applied. Each lightfield or tile is compressed separately. Alternatively, the lightfields are compressed by comparison between lightfields, such as using MPEG compression with the lightfields treated as a sequence.

In one embodiment, the radiances or lightfields for each layer are compressed independently of other layers. The lightfield for one layer is compressed separately from the lightfield for a different layer. Since the same surface or objects are likely to occur in the same layer, compressing by layer or independently for each layer may speed compression or make compression more efficient. Measurements within a layer are more likely to have a similarity that can be exploited for compression by considering different layers at a time.

Where tiles are used, each tile may be compressed independently with image compression. Tiles facilitate compression since there is more coherency between pixels of the same depth. To assist in compression, pixels in a tile that do not exist at a certain depth for that tile may be marked with an invalid value to avoid use in the compression. For example, some pixels of a tile at a given layer do not represent a surface (i.e., the rays for rending the lightfield intersect only air or fluid for that layer). These pixels within the tile are flagged to avoid burdening the compression.

In act 38, the scanner, computer, graphics processing unit, renderer, or other device stores the lightfields for the different depths. The storage of the lightfields includes recording into memory the radiances for the different surface or objects. These lightfields for different surfaces and/or objects are stored as layers, such as layers of tiles, for each of the camera positions or views. The layers correspond to different depths of the surfaces for the camera views or positions along the slap or sphere.

The lightfield layers and the corresponding depths are stored. For ray-by-ray or pixel-by-pixel lightfields, the depths of the different surfaces for each ray or pixel are stored. For tile-by-tile depth complexity, the depths for each layer for each sub-region are stored. Alternatively, the pixel-by-pixel depth for pixels in each tile is stored. For storage of lightfields as images without tiling, the depths for each lightfield (e.g., whole frame), tile-by-tile, and/or pixel-by-pixel are stored.

The lightfields are stored as compressed. After compression, the amount of memory needed is reduced. In alternative embodiments, the lightfields without compression are stored.

For rendering an image from the lightfields, a camera location and orientation are received in act 40. The renderer, such as a graphics processing unit, receives the camera view. The camera view is provided from a user input on a user input device. In alternative embodiments, such as fly-through, a processor determines a path through the volume, and the camera position and orientation are provided by the processor. The user may alter the camera and/or interact with the fly-through in a way that changes the camera view.

Where the camera location is outside of the volume or within the volume but outside of any objects (e.g., outside a skin surface of a medical scan volume), lightfield rendering using one lightfield layer is performed. Where the camera is at other locations within the volume, such as past an outer surface or within an object (e.g., within the inner sphere of the parameterization of the lightfields), the position of the camera is determined to be between depths or layers of the lightfields. Given the camera orientation or perspective, the depths for the different lightfield layers are used to select the lightfields visible to the camera at the interior location.

In one embodiment, the camera location relative to the depths is determined based on the recorded depths of the lightfields. In another embodiment, the camera location relative to a three-dimensional model is determined. For example, segmented scan data is used as the three-dimensional model. The camera location within the scan volume represented by the segmented scan data is determined. The lightfield layers are related to or correspond to different segmented parts of the three-dimensional model. By determining the position and orientation of the camera within the three-dimensional model, the lightfield layers visible to the camera is determined.

Due to the layering of the lightfields, the camera may be positioned within a space enclosed within the three-dimensional model, may be within the inner sphere (e.g., convex hull) of the parameterization, and/or may be used to view information that would be occluded by a surface or object. The layering of lightfields allows for fly-through or other rendering from within the scan volume and/or behind an occlusion.

In act 42, the radiances are streamed from the memory to the renderer or graphics processing unit. Based on the received camera location and orientation, the lightfield or lightfields used for lightfield rendering are streamed or transferred for rendering. For example, the radiances for the tiles in the field of view of the camera are streamed to a graphics processing unit as virtual textures.

For tiles, only one layer per sub-region or tile location is provided. The lightfield for the layer visible to the camera is streamed. Only one depth or layer is visible to a given camera location and orientation. Alternatively, information from more than one layer representing a given sub-region is streamed.

Figure 4:
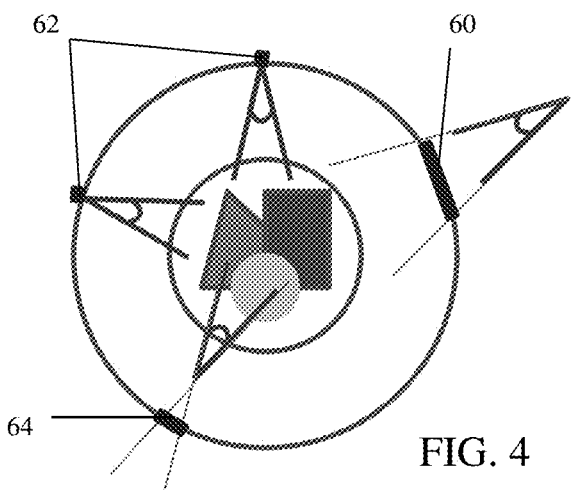
FIG. 4 illustrates an example parameterization of the lightfields as two enclosing spheres for lightfield rendering.

Depending on the exact camera location from which the new view is generated, different regions of the light field are to be available in fast memory (e.g., buffer or cache of a graphics processing unit). FIG. 4 shows the objects of interest (e.g., as three geometric shapes) inside the two spheres for the parameterization of the lightfields. The camera locations for the generation of the light field are distributed along the outer sphere, all pointing towards the inner sphere, capturing the object of interest. Where the camera field of view intersects 60, 62, 64 the outer sphere are the lightfield regions that are to be available for interpolation. Rays from within the camera view frustum intersect the outer sphere anywhere in the area 60, 62, 64 on the sphere. Views that are generated by camera positions outside the intersection on the sphere may not be necessary for the image generation, so the corresponding lightfield is not streamed. For border cases for interpolation, the next camera position outside the area of intersection on the outer sphere may be streamed as well.

Camera positions on the outer sphere cover the smallest regions (e.g., intersections 62). In the case of zooming operations, the viewing angle of the camera decreases. Due to the layering, the camera may be positioned within the outer and inner spheres. For example, the camera is positioned within the bottom of the circle viewing upward. The surfaces for the rectangle and triangle are visible, but the circle surface is not to be visible. The lightfields for the layers from this camera perspective having the rectangle and triangle surfaces are streamed. With this position and orientation information, the appropriate tile or tiles from the lightfield structure at the appropriate depth is fetched from the compressed representation and decompressed in memory for fast access by a central processing unit or graphics processing unit.

In act 44 of FIG. 1, the scanner, computer, graphics processing unit, central processing unit, or other device renders an image from the lightfields. Based on the position of the camera relative to the depths of the lightfield layers, the visible lightfield or lightfields are identified and used to render. The position of the camera relative to the depths of the lightfield layers determines which lightfields are visible. Using interpolation or other lightfield rendering, an image is generated from the visible lightfield or lightfields. The renderer performs any now known or later developed generation of an image from the lightfields. The radiances are used to generate the image. Where the camera is within the volume, object, surface, or group of objects, lightfields for surfaces that would occlude if the camera were outside the volume are not used. Instead, lightfields visible to the camera at the interior position and orientation are used.

For example in FIG. 2, where the camera is in the cross-lined region between objects A and B viewing along the ray direction, lightfields for the depth associated with object B are used, and lightfields for the depth associated with object A are not used. Without layering, the lightfield for this camera direction would only provide a view of object A as object A occludes object B. Due to the layering, lightfield rendering of object B, the back surface of object A, or other parts along the depth of the ray lines is provided. The resulting rendered image shows one interior part (e.g., object B) as viewed from the other interior part (e.g., object A) or other location beyond the other interior part from the ray origin outside the volume.

In act 46, the rendered image is displayed on a display. The renderer buffers the image and causes the image to be output to the display. For example, a medical image representing a scanned volume as viewed from within the volume is displayed. The medical image represents a given field of view at the location in the volume.

The user may alter the field of view, allowing interaction to review anatomy or medical scan information. Alternatively, the field of view is altered as part of a programmed or selected fly-through or other change in field of view. Acts 40-46 are repeated. Based on the new camera location and/or orientation from act 40, the lightfields showing the new view are streamed in act 42, used to render in act 44, and the resulting image is displayed in act 46.

This alteration may move the camera in and out of the volume. The camera may pass through a surface. Due to the layered lightfields, there are lightfields available for the view beyond a surface. As the camera passes through the surface, the view beyond is rendered from the other lightfields. In alternative embodiments, the visible lightfields are rendered with a variable level of transparency so that the occluded surface may contribute to the rendered image.

In another fly-through embodiment, the camera passes through surfaces or along a surface within the volume. For example, the camera is positioned within a tubular surface of the volume representing a vessel, colon, or other tissue. The camera moves along the surface. Due to layered lightfields, the camera may view beyond the surface and/or pass through the surface to allow inspection of surrounding tissue.

FIG. 5 shows one embodiment of a system for occlusion handling in lightfield rendering. In one approach, the system creates layered lightfields. Lightfields or radiance are captured at any surfaces or objects along the view direction for each camera perspective. In another approach, the system uses the layered lightfields to render an image. The rendering camera position is free to move throughout the volume, including through surfaces, due to the layered lightfields. In yet another approach, the system both creates the layered lightfields and uses the layered lightfields to render an image of a volume.

To allow for interaction by the user, the layered lightfields are used to render a view for each location, zoom, and/or orientation. As the user alters the view direction, location, or zoom interactively, the appropriate lightfields are used to render the new view. Since layered lightfields are used, the options for rendering may be less limited as information beyond an occluding surface is available.

The system is configured to implement the method of FIG. 1 or other methods. In the example below, the scanner 12 creates the layered lightfields, and the graphics processing unit 18 renders from the layered lightfields. In other embodiments, a separate computer, workstation, or server creates the layered lightfields and stores them in the memory 14, which is separate from, or part of the scanner 12. In yet other embodiments, the graphics processing unit 18 creates the layered lightfields and renders from the layered lightfields. In another embodiment, the scanner 12 creates and renders from the layered lightfields.

In one embodiment, the graphics processing unit 18 is part of the scanner 12 and the memory 16 is part of the memory 14 or a separate memory (e.g., GPU memory). In other embodiments, the system is a workstation, computer, or server for creating and/or rendering from layered lightfields based on scan data representing a volume (e.g., voxels representing one or more objects).

The system includes the scanner 12, memory 14, memory 16, graphics processing unit 18, and display 20. Additional, different, or fewer components may be provided. For example, only one memory and/or no scanner 12 are provided. As another example, a user input and interface is provided for interactivity with the rendering. In yet another example, interfaces, busses, and/or one or more networks are provided for communications between devices.

The scanner 12 is a medical imaging system, such as a computed tomography, magnetic resonance, ultrasound, x-ray, fluoroscopy, or emission tomography (i.e., functional imaging such as PET or SPECT) system. The medical imaging system is any now known or later developed medical imaging system for scanning an interior of the patient. In alternative embodiments, the scanner 12 is an industrial or other scanner for scanning an interior of an object or machine, such as an x-ray or acoustic scanner for life expectancy or fault testing. In yet another alternative embodiment, the scanner is not provided, but instead a synthetic or programmed volume is used without scanning an object. A medical imaging system is used in the discussion below.

The scanner 12 is configured to scan an internal region of the patient or other volume. Any portion or extent of the patient may be scanned, such as a scan of an organ, torso, extremity, or full body. The scan acquires data representing the interior of the patient. The represented portion includes a volume or three-dimensional distribution of response from the patient. The scanned volume includes any number of objects, such as different types of tissue, organs, and/or fluids. The scan data represents the different objects in the volume. The scan data may be segmented to specifically identify different ones of the objects, such as flagging the voxels belonging to different organs.

The scan data may be a 3D reconstruction or data representing a volume. The data from the scan is formatted as voxels in an isotropic grid. For example, voxels in a 512×512×512 Cartesian grid are used. Anisotropic grids may be used. Other formats may be used, such as the data representing locations in a polar coordinate format. For each voxel or location, a scan response is provided by a scalar value (e.g., 16 bit dynamic range), but other representations may be used, such as RGB values.

For creating layered lightfields, the scan data is acquired by scanning. Alternatively, the scan data is obtained via upload, download, query from memory 14, or network transfer. The voxel data is obtained from a memory and/or from a medical scan.

The scanner 12, such as a controller, processor, or other device within the scanner 12, creates the layered lightfields. Alternatively, a separate or remote computer, server, or workstation creates the layered lightfields. Surface, volume, or other rendering of the scan data is performed for each of a plurality of different camera perspectives. For each perspective, the depths of different surfaces or objects represented in the volume are identified and lightfields are generated for each of the depths at which a surface or object of interest occurs. Due to the angle of viewing, a given surface may be represented in more than one layer, such as where the surface is partly occluded.

The memory 14 is a graphics processing memory, video random access memory, random access memory, system memory, cache memory, hard drive, optical media, magnetic media, flash drive, buffer, database, combinations thereof, or other now known or later developed memory device for storing the set or sets of voxel data (i.e., scan data), lightfields, or other data. In one embodiment, the memory 14 is part of the scanner 12. In alternative embodiments, the memory 14 is a database or other memory separate from the scanner 12.

The memory 14 is configured to store the layered lightfields. The lightfields visible at different depths along a view direction are stored. One or more lightfields are stored for each of a plurality of parameterized view directions. Slab, spherical, or other parameterization of the camera position relative to the volume may be used.

In one embodiment, the lightfields are stored in tiles. Each tile represents a sub-region of the visible region. Different tiles have different numbers of layers. Some tiles may have no layers (i.e., no lightfield). Other tiles may have only one layer. Other lightfields have two or more layers. Some of the layers provide representation of parts of objects or surfaces occluded by other surfaces or objects along the view direction.

The memory 16 is the same or different type of memory as the memory 14. In one embodiment, the memory 16 is a cache or other fast memory for access by the graphics processing unit 18 for rendering from lightfields. The memory 16 stores the lightfields as textures or other structure.

The graphics processing unit 18 is a graphics card or graphics chip. In other embodiments, a controller, server, central processing unit, workstation, computer or other renderer is used instead of or as the graphics processing unit 18.

The graphics processing unit 18 is configured to render an image of the volume from the layered lightfields. Based on a camera location and orientation, different layers of the layered lightfields are selected. The layer appropriate for a given location and orientation is found, such as from a three-dimensional model of the volume. Lightfields for similar camera perspectives are loaded. As the location and/or orientation of the camera changes, the lightfields used from the memory 16 may change. For each pixel in the image, one or more lightfields are obtained for rendering.

Using interpolation, the graphics processing unit 18 renders an image from the lightfields. One of the layered lightfields for a given view direction is used and not another for the rendering. The graphics processing unit 18 determines which surfaces and/or objects should and should not occlude given the camera position and orientation, so renders from the lightfields of the appropriate layers.

The graphics processing unit 18 is configured to generate an image from the lightfields. The image is a single representation of the patient volume from a viewpoint and view direction. Since the lightfields are created prior to interaction by the user, the rendering from the lightfields may be rapid, allowing interactive generation of the images.

In one embodiment, a user input, such as a keyboard, button, slider, knob, track pad, mouse, touch sensor, or other sensor, is provided. The user input is configured to receive input from the user. The input may configure the images for viewing, such using a slider or click-and-drag operation to rotate a view. By selecting a time, path location, or image, the user interacts to control camera position or field of view. The user input is used to indicate the desired view direction through rotation or direct entry of an angle. The change in view direction is then applied to the image. Similarly, the user input is used to change camera location, and the change is applied to the image.

For example, a default camera is positioned in the forward position along a fly-through path. As the fly-through commences, the camera is moved along the path with the graphics processing unit 18 rendering from lightfields for the views along the path. The user pauses the fly-through and uses the user input to change the camera position and/or orientation. Other user interaction may be provided, such as the user entering a transparency level of surfaces. The user may move the camera through a surface to view objects beyond the occluding surface even in lightfield rendering.

The display 20 is a CRT, LCD, LED, projector, plasma, printer, or other display device. The display 20 displays one or more images provided in a display buffer. The lightfield rendered mages are displayed on the display 20. In the medical embodiments, the rendered images assist in diagnosis. Due to the use of layered lightfields, the advantages of lightfield rendering are provided (e.g., rapid rendering from pre-created lightfields for interactive or real-time panning, moving, and/or zooming) while avoiding occlusion common to lightfield rendering.

Graphics for interaction, such as icons to rotate, move, or zoom may be alternatively or additionally displayed. Other information may be displayed, such as a representation of the fly-through path.

The scanner 12, graphics processing unit 18, and/or other processors are configured by software, firmware, and/or hardware. The memory 14, memory 16, and/or other memory are computer readable storage media storing data representing instructions executable by the scanner 12, graphics processing unit 18, or other processor for occlusion handling in lightfields. The instructions for implementing the processes, methods, and/or techniques discussed herein are provided on computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for occlusion handling in lightfield rendering, the method comprising:
   for a first camera perspective, generating lightfields for first and second depths such that the lightfield for the second depth is free of occlusion from a first object included in the first depth where the first depth separates the second depth from a camera having the first camera perspective;
   determining a position of the camera relative to the first and second depths;
   rendering, by a renderer, an image from the lightfields based on the position of the camera relative to the first and second depths; and
   displaying the image on a display.

2. The method of claim 1 wherein generating the lightfields comprises generating a first set of tiles and a second set of tiles for the first camera perspective, the first set of tiles including radiance and orientation information visible for the first depth and the second set of tiles including radiance and orientation information visible for the second depth without occlusion from the object in the first depth.

3. The method of claim 2 wherein the first set of tiles includes a first spatial distribution at the first depth of the first object and any other first objects in the first depth, and wherein the second set of tiles includes a second spatial distribution at the second depth of any second objects in the second depth.

4. The method of claim 3 wherein the first set of tiles includes tiles for spatial locations not included in the second set of tiles and includes tiles for spatial locations included in the second set of tiles.

5. The method of claim 1 wherein determining the position comprises determining the position to be between the first and second depths where the first camera perspective is directed towards the second depth, and wherein rendering comprises rendering from the lightfields for the second depth and not the lightfields for the first depth.

6. The method of claim 1 further comprising storing the lightfields for the first and second depths and storing the first and second depths.

7. The method of claim 1 wherein generating the lightfields comprises rendering from medical scan data representing first and second interior parts of a patient, wherein determining the position comprises determining the position within the first interior part of the patient, and wherein rendering comprises rendering from the lightfields for the second depth where the first depth corresponds to the first interior part and the second depth corresponds to the second interior part, the image showing the second interior part viewed from the first interior part.

8. The method of claim 1 wherein determining the position comprises determining the position from a three-dimensional model where the position is within a space enclosed within the three-dimensional model.

9. The method of claim 1 wherein rendering comprises lightfield rendering.

10. The method of claim 1 further comprising altering the position of the camera as part of a fly-through transitioning from the first depth to the second depth and repeating the rendering and displaying using the altered position.

11. The method of claim 1 further comprising compressing the lightfields for the first depth separately from compressing the lightfields for the second depth.

12. A system for occlusion handling in lightfield rendering, the system comprising:
   a scanner configured to scan a volume including different objects, the scan providing scan data representing the different objects in the volume;
   a memory configured to store layered lightfields generated from the scan data, the layered lightfields being for different depths for a first view direction;
   a graphics processing unit configured to render an image of the volume from the layered lightfields where different layers of the layered lightfields are selected for different locations in the image based on a location of a virtual camera along the first view direction; and
   a display configured to display the image.

13. The system of claim 12 wherein the memory is configured to store the layered lightfields in tiles, some of the tiles including multiple of the layered lightfields and others of the tiles including only one of the layered lightfields.

14. The system of claim 12 wherein the graphics processing unit is configured to render from one of the layered lightfields and not another of the layered lightfields.

* * * * *